United States Patent [19]

Golser et al.

[11] 4,238,743
[45] Dec. 9, 1980

[54] GAS LASER HAVING A CYLINDRICALLY-SHAPED DISCHARGE TUBE

[75] Inventors: Hans Golser; Erich Kirschner, both of Munich, Fed. Rep. of Germany

[73] Assignee: Siemens Aktiengesellschaft, Berlin & Munich, Fed. Rep. of Germany

[21] Appl. No.: 964,631

[22] Filed: Nov. 29, 1978

[30] Foreign Application Priority Data

Dec. 8, 1977 [DE] Fed. Rep. of Germany ....... 2754756

[51] Int. Cl.³ .............................................. H01S 3/03
[52] U.S. Cl. ........................... 331/94.5 T; 331/94.5 D
[58] Field of Search ...................... 331/94.5 C, 94.5 D, 331/94.5 G, 94.5 PE, 94.5 T

[56] References Cited

U.S. PATENT DOCUMENTS 3,988,698 10/1976 Crane et al. .................... 331/94.5 D
4,081,762 3/1978 Golser et al. .................. 331/94.5 D

FOREIGN PATENT DOCUMENTS 2506707 7/1976 Fed. Rep. of Germany .
2604740 8/1976 Fed. Rep. of Germany .

OTHER PUBLICATIONS

Wright et al., Laser Becomes a Component for Mass-Market Applications, Electronics (Jun. 13, 1974), pp. 91-95.
Golser et al., Component Parts Report, vol. 14, No. 1, 1976, pp. 1-4. -

*Primary Examiner*—William L. Sikes
*Attorney, Agent, or Firm*—Hill, Van Santen, Steadman, Chiara & Simpson

[57] ABSTRACT

A gas laser havinng a cylindrically-shaped discharge tube in which at least one end is terminated with a metal end cap which supports a mirror body in its central area, supports a metal pump stem in a position eccentric to the longitudinal axis of the tube and supports a thermal compensation element in a position opposite and radially symmetrical to the pump stem whereby at gas laser operating temperatures, the compensation element deforms the metal end cap to substantially the same extent as the pump stem so that the influence of cap deformation on the mirror orientation relative to the longitudinal axis of the tube is minimized or at least approximately compensated.

12 Claims, 2 Drawing Figures

U.S. Patent     Dec. 9, 1980     4,238,743
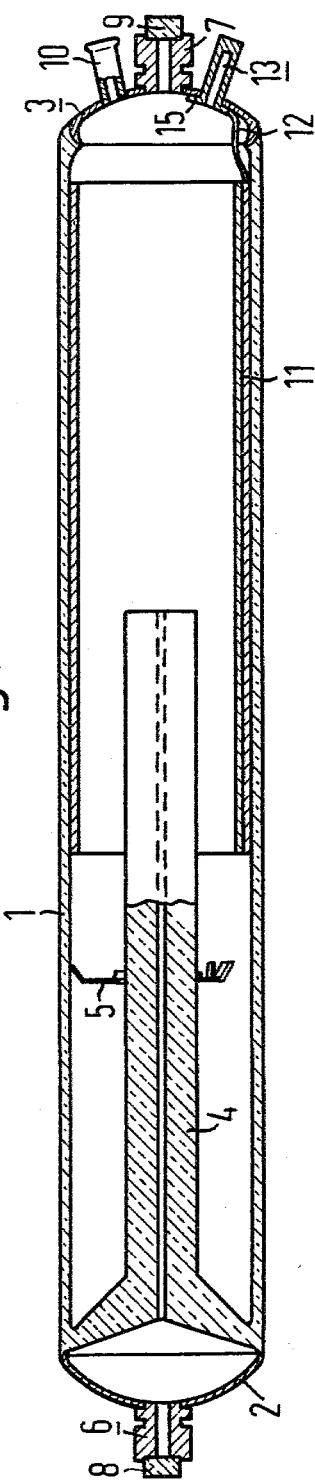
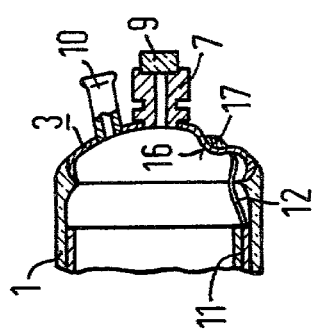

GAS LASER HAVING A CYLINDRICALLY-SHAPED DISCHARGE TUBE

BACKGROUND OF THE INVENTION

1. Field of the Invention

The invention relates to lasers and somewhat more particularly to a gas laser having a cylindrically-shaped discharge tube in which at least one end is terminated with a metal end cap which supports a mirror body in its central area and supports a metal pump stem positioned eccentric to the longitudinal axis of the tube.

2. Prior Art

Gas lasers having a cylindrically-shaped discharge tube having an end terminated with a metal end cap which supports a mirror body at a central area thereof and supports a metal pump stem in a position eccentric to the longitudinal axis of such tube are known; for example see German Offenlegungsschrift No. 26 04 740, German Auslegeschrift No. 25 06 707, U.S. Pat. No. 3,988,698, "Electronics", June 13, 1974 pages 91–95, or "Component Part Report", Vol. 14, 1976, pages 1–4, all of which are incorporated herein by reference.

These type of gas lasers are finding increased acceptance in the marketplace because of their simple and sturdy construction as well as their favorable price/output ratio. Practical experience has shown, however, that the presently available "coaxial" lasers of this type often still do not emit a light beam that is sufficiently directionally stable over extended periods of time, this despite their cylindrically-symmetrical construction. Thus, for example, the demands made for spatial constancy of the output radiation beam by a TV video-disk scanner (a typical application for these types of gas lasers) cannot be obtained without further ado. If one seeking to obtain spatial constancy of a laser beam from such lasers attempted to utilize usual techniques, perhaps by using select materials which have an extremely low thermal-expansion coefficient or by selecting materials which are thermally mated with one another or even by mechanically clamping the discharge tube into a structurally stable housing, then one would see that such conventional measures only insignificantly limit the characteristic migration of a laser beam during the warm-up period. Further, such beam stabilization means would detract from the decisive advantageous features of coaxial lasers, that is, the externally smooth or symmetrical construction and the low price thereof would be jeopardized by the inclusion of conventional beam stabilization means.

SUMMARY OF THE INVENTION

The invention provides an economical gas laser construction which provides a spatially-constantly orientated output beam and which maintains a constant beam orientation even after relatively long operating periods and after numerous operating cycles.

In accordance with the principles of the invention, a gas laser of the type described above is improved by providing at least one thermal compensation element on a metal end cap so that such compensation element deforms the metal cap in essentially the same manner as the pump stem at the operating temperatures of the gas laser whereby the influence of cap deformation on mirror orientation (and thus on beam stability and/or orientation) relative to the longitudinal axis of the tube is minimized or at least partially compensated.

In typical embodiments of the invention, a single thermal compensation element positioned opposite and radially symmetrical to the pump stem is sufficient to maintain stable beam orientation. However, in certain embodiments of the invention, two or more thermal compensation elements may be utilized and are so-located as to act together in a manner similar to a single compensation element located opposite a pump stem.

In accordance with the principles of the invention, the thermal compensation elements are composed of the same metal as that forming the metal pump stem. Preferred metals are selected from the group consisting of copper, nickel-iron alloys, nickle-cobalt- iron alloys, (such as available under the trademark "Vacon") or mixtures thereof. In certain preferred embodiments, the thermal compensation element is in a form essentially identical to that of the pump stem. In other embodiments, the thermal compensation elements may comprise a capillary tube closed at a bottom end thereof or comprise a mass of solder having thermal characteristics similar to that of the pump stem. In certain preferred embodiments of the invention, the metal end cap, the pump stem and the thermal compensation element are all composed of an identical metal.

BRIEF DESCRIPTION OF THE DRAWINGS

FIG. 1 is an elevated cross-sectional view of an embodiment of a gas laser constructed in accordance with the principles of the invention; and FIG. 2 is an elevated cross-sectional view, partially broken away, of another embodiment of a gas laser constructed in accordance with the principles of the invention.

DESCRIPTION OF THE PREFERRED EMBODIMENTS

The invention provides an improved gas laser having a cylindrically-shaped discharge tube in which at least one end thereof is terminated with a metal end cap which supports a mirror body at a central area, supports a metal pump stem in a position on such metal cap eccentric to the longitudinal axis of the tube and supports at least one thermal compensation element in a position on the metal cap selected so that at the operating temperatures of the gas laser, such compensation element deforms the metal cap substantially similarly to the deformation caused by the pump stem and the influence of cap deformation on mirror orientation is substantially minimized or at least partially compensated.

The development of the invention occured from the following observations. When one activates a coaxial laser, the laser beam migrates with increasing warm-up of the tube until it arrives at a deflection maximum, typically within a short time after reaching the final operating temperature. From such maximum deflection, the beam then returns somewhat before it finally comes to rest. The migration direction, as has been confirmed by numerous observations, always coincides, remarkly, with the direction in which the eccentrically mounted pump stem lies, as seen from the tube axis. In fact, beam fluctuations might be attributable to a previously overlooked or at least neglected fact that the pump stem constitute an asymmetrical thermal load on the metal cap, causing warping or deflection of such cap and, finally a tilting or disorientation of the mirror body mounted on such cap.

In accordance with the principle of the invention, the source of cap deflection is not eliminated, for example, by a relocation of the pump stem or by better material adaptation, but rather only the deformation effect is minimized or nullified by providing a suitably designed and positioned thermal compensation element. This type of compensation element is readily provided and requires only insignificant alterations in the mass production procedures currently utilized to produce known gas lasers of this type.

In the drawings, like elements or parts are designated by identical reference numerals and individual parts of a gas laser not absolutely necessary for an understanding of the invention, such as electrical supply lines or the like, have, for the sake of clarity, been omitted. Nevertheless, workers skilled in the art will readily supply such missing element and attain operational gas lasers.

Referring now to FIG. 1, a gas laser useful with T.V. video-disk scanners or the like is illustrated as having a discharge tube comprising a cylindrical glass envelope 1 which is sealed in a vacuum-tight manner at opposite ends thereof with respective fused-on metal end caps (a front side metal cap 3 and a back side metal cap 2). The glass envelope 1 concentrically surrounds a funneled glass capillary 4 which is fused to the inner walls of the envelope 1 at the outer funnel edges thereof, as shown. The capillary 4, which in certain embodiments may be comprised of a ceramic material, is supported along its length by at least one spring means 5 to attain desired stability. Both metal end caps 2 and 3 are each provided with a central aperture, each of which are provided with a respective mirror mounting means 6 and 7 composed of a metal and soldered onto the respective end cap. Each mirror mounting means is then provided with a mirror body 8 and 9, respectively. The mirror bodies are hermetically sealed to the respective mirror mounting means via a glass solder. The side surface of each mirror mounting means 6 and 7 is weakened, as by provided grooves or the like, for adjustment purposes so that each mounting means is plastically deformable along such weakened zones.

In the embodiment here under discussion, a rolled aluminum sheet 11 is positioned within the glass envelope 1 to function as a cathode for the gas discharge. The rolled aluminum sheet presses against the inner surfaces of the glass envelope via a spring-like effect. The aluminum sheet or cathode 11 is connected with the front metal end cap 3 via a feed line 12 so that a specific cathode lead-in may be dispensed with. The anode is formed by the bottom end mirror mounting means 6. With careful construction and sufficiently high annealing temperatures, a getter is not absolutely necessary. Although one may be positioned within the glass envelope if desired.

The front metal end cap 3 is provided with a pump stem 10 at a location radially eccentric to the longitudinal axis of the envelope 1. In addition, the front metal end cap 3 is also provided with a thermal compensation element 13 at a location selected to deform the metal cap at the laser operating temperatures in substantially the same manner as pump stem 10 so that misorientation of the mirror body 9 at the operating temperatures is minimized and/or avoided. In preferred embodiments, the thermal compensation element 13 is located radially symmetrically to the pump stem. In the embodiment here under discussion, the thermal compensation element comprises a short capillary tube ("muff") which is closed at an outer end thereof. As can be seen from the drawings, such capillary tube or thermal compensation element 13 may include a flange 15 on the end projecting into the discharge tube so that such flange is in contact with the feed line 12.

In certain preferred embodiments, the capillary tube or thermal compensation element 13 is composed of the same metal as in the pump stem 10. In an exemplary form of such embodiments, the discharge envelope is composed of a glass, the metal cap is composed of a nickel-iron based alloy or a nickel-cobalt-iron based alloy, such as is available under the trademark "Vacon", while the pump stem and a thermal compensation element are each composed of copper.

In other preferred embodiments, the metal end cap, the pump stem and the thermal compensation element are all composed of the same metal. In an exemplary form of such embodiment, the discharge envelope is composed of a glass, the metal cap, the pump stem and a thermal compensation elements are composed of "Vacon".

In certain preferred embodiments, the thermal compensation element is of essentially the same form as the pump stem. In certain of these embodiments, such as illustrated in FIG. 1, the thermal compensation element is a capillary tube closed on its bottom end thereof. In other forms of these embodiments, the thermal compensation element is also a pump stem.

In the embodiment here under discussion (FIG. 1) the envelope is composed of a glass, such as hard glass with a coefficient of thermal expansion $\alpha = 50.10^{-7}$, the metal caps are composed of "Vacon" (a registered trademark of the company Vacuum-Schmelze GmbH for alloys selected from group comprising Ni-Fe or Ni-Fe-Co as the main component, further defined, for example, in "Roempps Chemie-Lexikon", 1977 page 3767) and the pump stem and the thermal compensation element are composed of copper. The discharge tube is filled with a helium-neon mixture (at a mixture ratio ranging between about 6:1 to 10:1 and at a filling pressure ranging between about 2 to 4 torr). Such gas laser is operated with the following electrical values: ignition voltages of about 5 to 6 kV, an anode voltage of about 1 kV, an anode current of up to about 6 mA and a compensation resistance of at least about 60 k ohm. The output capacity of such gas lasers ranges between about 1 and 2 mW.

FIG. 2 illustrates another embodiment of the invention. The construction of this embodiment is quite similar to the embodiment discussed in conjunction with FIG. 1, except that in the present embodiment, the thermal compensation element, instead of a capillary tube or muff, comprises a mass of solder 17 applied into a depression or pimple 16 formed on the outer surface of metal end cap 3. The solder may consist of Cu-Ge. The depression or pimple 16 is formed at a location on the metal end cap selected to be symmetrical and radially opposite from the position of the pump stem 10 so that when the solder mass is positioned within such depression it will counter the deflection influence of the pump stem on the metal end cap in a manner similar to that of the capillary tube described in conjunction with FIG. 1.

With the foregoing general discussion in mind, there is presented a detailed example which will illustrate to those skilled in the art the advantages attained by the practice of the invention and provide a comparison of the invention with prior art structure.

The following table contains test results which were obtained from comparing a coaxial gas laser of conventional construction against improved gas laser constructed in accordance with the principle of the invention.

Structure I comprises model LGR 7621 having "Vacon"-metal end caps and a copper pump stem as described in the earlier-referenced "Component Part Report". Structure II differs from Structure I only in that the copper pump stem was replaced by a "Vacon" pump stem. Structure III differs from Structure I in that the metal end cap, in addition to a copper pump stem was also provided with a muff-shaped copper "pump stem" as a thermal compensation element. Structure IV differs from Structure III only in that the copper pump stem and copper muff were replaced by identical pump stem and muff structures composed of "Vacon". All four of the above structures were heated in an oven from 20° C. to 80° C., the operating temperature within a typical T.V. videodisk scanner. A measuring plane (in which the migration of the individual laser beams was measured) was located at an interval of 25 mm from the respective output mirror of each laser structure. Measurements were made of the maximum beam deviation (line 1): the beam deviation between the initial position thereof and the beam position after the attainment of the final temperature (line 2); and the difference or distance between the position which the laser beam assumes after ignition on the basis of self-heating (about 40° C. in instances of uninhibited heat transfer between the laser tube and the surrounding environment) and the position the beam assumes after heating-up of the tube to 80° C. in the oven.

| | TESTED GAS LASER STRUCTURE | | | |
|---|---|---|---|---|
| | I | II | III | IV |
| | LGR 7621 | LGR 7621 | LGR 7621 | LGR 7621 |
| | 1 Cu Pump Stem | 1 Vacon Pump Stems | 2 Cu Pump Stems | 2 Vacon Pump Stems |
| MEASUREMENTS | | | | |
| Largest beam deviation upon heating to 80° C. | 115 μ | 100 μ | 75 μ | 80 μ |
| Difference between initial beam position at 20° C. and final beam position at 80° C. | 100 μ | 50 μ | 40 μ | 36 μ |
| Difference between final beam position with self-heating at about 40° C. and beam position on heating to 80° C. | 75 μ | 20 μ | 9 μ | 5 μ |

As is apparent from the foregoing table, a gas laser structure having two copper stems provides better beam spatial stability as compared to a similar laser structure having a single copper stem. Further, in laser structures which utilize a material for the pump stem and for the thermal compensation element which is thermally adapted or matched with the material of the metal cap, i.e. "Vacon", additionally improved results are obtained. Thus, as can be seen, Structure IV, at first, exhibits a somewhat larger beam deviation from that of Structure III, however, the beam deviation from the initial position to the stabilized state is the least in Structure IV and the beam deviation in this structure (Structure IV) is the least sensitive to changes in operating temperatures at the stabilized state.

The principles of the invention are not, of course, limited to the exemplary embodiments discussed. Thus, workers skilled in the art can readily determine a desired form for the thermal compensation element, although generally, it is preferred to have the compensation element in a form similar or identical to that of the pump stem. In applying the principle of the invention, it is of primary importance to balance out the influence of the pump stem (which causes beam migration during the warm-up of a discharge tube) by a suitable thermal compensation element (preferably applied onto a metal end cap radially symmetrical with and opposite to the pump stem), which may be formed of one or more parts. Thus, for example, one may position a muff (i.e. a thermal compensation element) so that it projects into the interior of the discharge tube or one could provide an end cap with two identical pump stems lying substantially radially opposite one another. In addition, in a given situation, it may be desirable to move the point of connection between the end cap and the pump stem or stems out of the cap plane, as by providing a transition portion composed of a material thermally matched to the material forming the end cap. An exemplary embodiment of this type comprises a "Vacon" end cap, a "Vacon"-transition portion and a Cu-pump stem and Cu-muff.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a gas laser having a cylindrically-shaped discharge tube which has at least one end thereof terminated with a metal end cap which supports a mirror body in a central area of such cap and supports a metal pump stem in a position eccentric to a longitudinal axis of the tube, said mirror body being orientated along the longitudinal axis of said tube, the improvement comprising wherein:

said metal end cap is provided with at least one thermal compensation element located at a select position of said end cap so that at gas laser operating temperatures, said compensation element deforms the end cap to a substantially identical extent as the pump stem so that the influence of end cap deformation on mirror orientation relative to the longitudinal axis of the tube is at least approximately compensated.

2. In a gas laser as defined in claim 1 wherein said thermal compensation element is located substantially radially symmetrical to and opposite said pump stem on said metal end cap.

3. In a gas laser as defined in claim 1 wherein said thermal compensation element and said pump stem are formed of an identical metal.

4. In a gas laser as defined in claim 3 wherein said discharge tube includes an envelope composed of glass, said end cap member is composed of an alloy selected from the group consisting of a Ni-Fe based alloy and a Ni-Fe-Co based alloy and said pump stem and thermal compensation element are composed of copper.

5. In a gas laser as defined in claim 1 wherein said pump stem and metal end cap are composed of an identical metal.

6. In a gas laser as defined in claim 1 wherein said discharge tube includes an envelope composed of glass and said end cap, said pump stem as well as said thermal compensation element are composed of an alloy selected from the group consisting of a Ni-Fe based alloy and a Ni-Fe-Co based alloy.

7. In a gas laser as defined in claim 1 wherein said thermal compensation element is of an essentially identical form to that of said pump stem.

8. In a gas laser as defined in claim 7 wherein said thermal compensation element comprises a capillary tube which is closed on a bottom side thereof.

9. In a gas laser as defined in claim 7 wherein said thermal compensation element is also a pump stem.

10. In a gas laser as defined in claim 1 wherein said thermal compensation element is defined by a depression on the outer surface of said metal cap, said depression being filled with a solder mass.

11. In a gas laser as defined in claim 1 wherein said metal end cap is connected to said pump stem via a transition portion.

12. In a gas laser as defined in claim 11 wherein at least said end cap and said transition portion are composed of an identical metal.

* * * * *